(12) United States Patent
Kiyohara et al.

(10) Patent No.: US 8,818,026 B2
(45) Date of Patent: Aug. 26, 2014

(54) OBJECT RECOGNITION DEVICE AND OBJECT RECOGNITION METHOD

(75) Inventors: Masahiro Kiyohara, Hitachinaka (JP); Kota Irie, Sagamihara (JP); Naoki Kourogi, Hitachinaka (JP); Tatsuhiko Monji, Hitachinaka (JP); Yoshitaka Takahashi, Hitachi (JP); Shoji Muramatsu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 171 days.

(21) Appl. No.: 12/918,042

(22) PCT Filed: Apr. 24, 2009

(86) PCT No.: PCT/JP2009/058161
§ 371 (c)(1),
(2), (4) Date: Nov. 16, 2010

(87) PCT Pub. No.: WO2009/131210
PCT Pub. Date: Oct. 29, 2009

(65) Prior Publication Data
US 2012/0269382 A1    Oct. 25, 2012

(30) Foreign Application Priority Data
Apr. 25, 2008 (JP) .................. 2008-115681

(51) Int. Cl.
*G06K 9/00* (2006.01)
(52) U.S. Cl.
USPC ........................................ 382/103
(58) Field of Classification Search
None
See application file for complete search history.

(56) References Cited

U.S. PATENT DOCUMENTS

| | | | | |
|---|---|---|---|---|
| 7,551,067 B2* | 6/2009 | Otsuka et al. | ................ | 340/436 |
| 7,714,704 B1* | 5/2010 | Mellen | ................ | 340/425.5 |
| 7,769,506 B2* | 8/2010 | Ohtsuji | ................ | 701/25 |
| 7,974,445 B2* | 7/2011 | Nagaoka et al. | ................ | 382/106 |
| 8,144,926 B2* | 3/2012 | Mori et al. | ................ | 382/103 |
| 8,169,309 B2* | 5/2012 | Asari | ................ | 340/435 |
| 8,175,806 B2* | 5/2012 | Kodaira et al. | ................ | 701/523 |
| 8,200,204 B2* | 6/2012 | Cho | ................ | 455/414.2 |
| 8,699,755 B2* | 4/2014 | Stroila et al. | ................ | 382/106 |
| 2001/0036293 A1 | 11/2001 | Laumeyer et al. | | |

(Continued)

FOREIGN PATENT DOCUMENTS

EP    1 725 035 A1    11/2006
EP    1 830 321 A2    9/2007

(Continued)

OTHER PUBLICATIONS

International Search Report with English translation dated May 26, 2009 (Four (4) pages).

(Continued)

*Primary Examiner* — Nancy Bitar
(74) *Attorney, Agent, or Firm* — Crowell & Moring LLP

(57) ABSTRACT

An object recognition device includes; an image-capturing unit mounted to a mobile body; an image generation unit that converts images captured by the image-capturing unit at different time points to corresponding synthesized images as seen vertically downwards from above; a detection unit that compares together a plurality of the synthesized images and detects corresponding regions; and a recognition unit that recognizes an object present upon the road surface from a difference between the corresponding regions.

10 Claims, 12 Drawing Sheets

(56) References Cited

U.S. PATENT DOCUMENTS

| | | | |
|---|---|---|---|
| 2003/0046003 A1* | 3/2003 | Smith et al. | 701/213 |
| 2007/0206833 A1* | 9/2007 | Otsuka et al. | 382/103 |
| 2009/0088978 A1* | 4/2009 | Ishikawa et al. | 701/223 |
| 2012/0249801 A1* | 10/2012 | Nozaki | 348/164 |

FOREIGN PATENT DOCUMENTS

| | | |
|---|---|---|
| JP | 7-152434 A | 6/1995 |
| JP | 7-210784 A | 8/1995 |
| JP | 11-203446 A | 7/1999 |
| JP | 2001-236506 A | 8/2001 |
| JP | 2007-66305 A | 3/2007 |
| JP | 2007-235642 A | 9/2007 |

OTHER PUBLICATIONS

European Search Report dated Sep. 27, 2013 (Nine (9) pages).
Danescu et al., Lane Geometry Estimation in Urban Environments Using a Stereovision System, Proceedings of the 2007 IEEE Intelligent Transportation Systems Conference, Sep. 30-Oct. 3, 2007, pp. 271-276, Seatle, WA, USA.
Bertozzi et al., GOLD : A Parallel Real-Time Stereo Vision System for Generic Obstacle and Lane Detection, IEEE Transactions on Image Processing, Jan. 1998, pp. 62-80, vol. 7, No. 1.
European Search Report dated Sep. 30, 2013 (Nine (9) pages).

\* cited by examiner

OBJECT RECOGNITION DEVICE AND OBJECT RECOGNITION METHOD

TECHNICAL FIELD

The present invention relates to a technique for detecting an object by using an image.

BACKGROUND ART

A technique is known for detecting an object upon the surface of a road from an image captured by an image-capturing device that is mounted to a subject vehicle, and for determining its position relative to the subject vehicle.

For example, in the invention described in the cited Patent Reference #1, a technique is described in which, using an image-capturing device mounted to the subject vehicle, images are captured when a strobe is illuminated and when the strobe is not illuminated, and in which a photo-reflective mark is detected by comparing these images together.

Patent Reference #1: Japanese Laid-Open Patent Publication H7-152434.

DISCLOSURE OF THE INVENTION

Problems to be Solved by the Invention

However, with this technique described in Patent Reference #1, the burden upon the vehicle due to mechanical equipment is undesirably increased, because it is necessary to mount the strobe upon the vehicle. Furthermore, if the positions of the subject vehicle are substantially different at the timings that the images are captured, i.e. at the moment that the strobe is illuminated and at the moment that it is not illuminated, then there is a possibility that the comparison of the images may be difficult.

Thus, with the present invention, a technique is provided that is capable of detecting an object upon the road surface, which does not require a strobe illumination and has a simple structure.

Means for Solving the Problems

According to the 1st aspect of the present invention, an object recognition device comprises: an image-capturing unit mounted to a mobile body; an image generation unit that converts images captured by the image-capturing unit at different time points to corresponding synthesized images as seen vertically downwards from above; a detection unit that compares together a plurality of the synthesized images and detects corresponding regions; and a recognition unit that recognizes an object present upon the road surface from a difference between the corresponding regions.

According to the 2nd aspect of the present invention, in an object recognition device according to the 1st aspect, it is preferred that the detection unit detects the region from the shift amount of the mobile body between the plurality of synthesized images.

According to the 3rd aspect of the present invention, in an object recognition device according to the 2nd aspect, it is preferred that the detection unit comprises a sensor that detects at least one of vehicle speed, acceleration, and angular velocity, and a shift amount of the mobile body is calculated by using at least one of the sensors.

According to the 4th aspect of the present invention, in an object recognition device according to the 2nd aspect, wherein the detection unit detects a characteristic feature included in the plurality of synthesized images, and calculates a shift amount of the mobile body from a shift amount of the characteristic feature.

According to the 5th aspect of the present invention, in an object recognition device according to the 1st aspect, it is preferred that the recognition unit generates an added image by adding together the corresponding regions, and recognizes an object present upon a road surface from the added image.

According to the 6th aspect of the present invention, in an object recognition device according to the 1st aspect, it is preferred that an object that is recognized by the recognition unit is a manhole.

According to the 7th aspect of the present invention, in an object recognition device according to the 1st aspect, it is preferred that an object that is recognized by the recognition unit is a road marking.

According to the 8th aspect of the present invention, an object recognition method includes: a step of converting images captured at different time points to corresponding synthesized images as seen vertically downwards from above; a step of comparing together a plurality of the synthesized images and detecting corresponding regions; and a step of recognizing an object present upon a road surface from a difference between the corresponding regions.

Advantageous Effect of the Invention

As described above, the object recognition device of the present invention is capable of providing a technique that can recognize an object upon the road surface, which does not require a strobe illumination and has a simple structure.

BEST MODES FOR CARRYING OUT THE INVENTION

In the following, preferred embodiments for implementation of the present invention will be explained with reference to the drawings.

The First Embodiment

Figure 1:
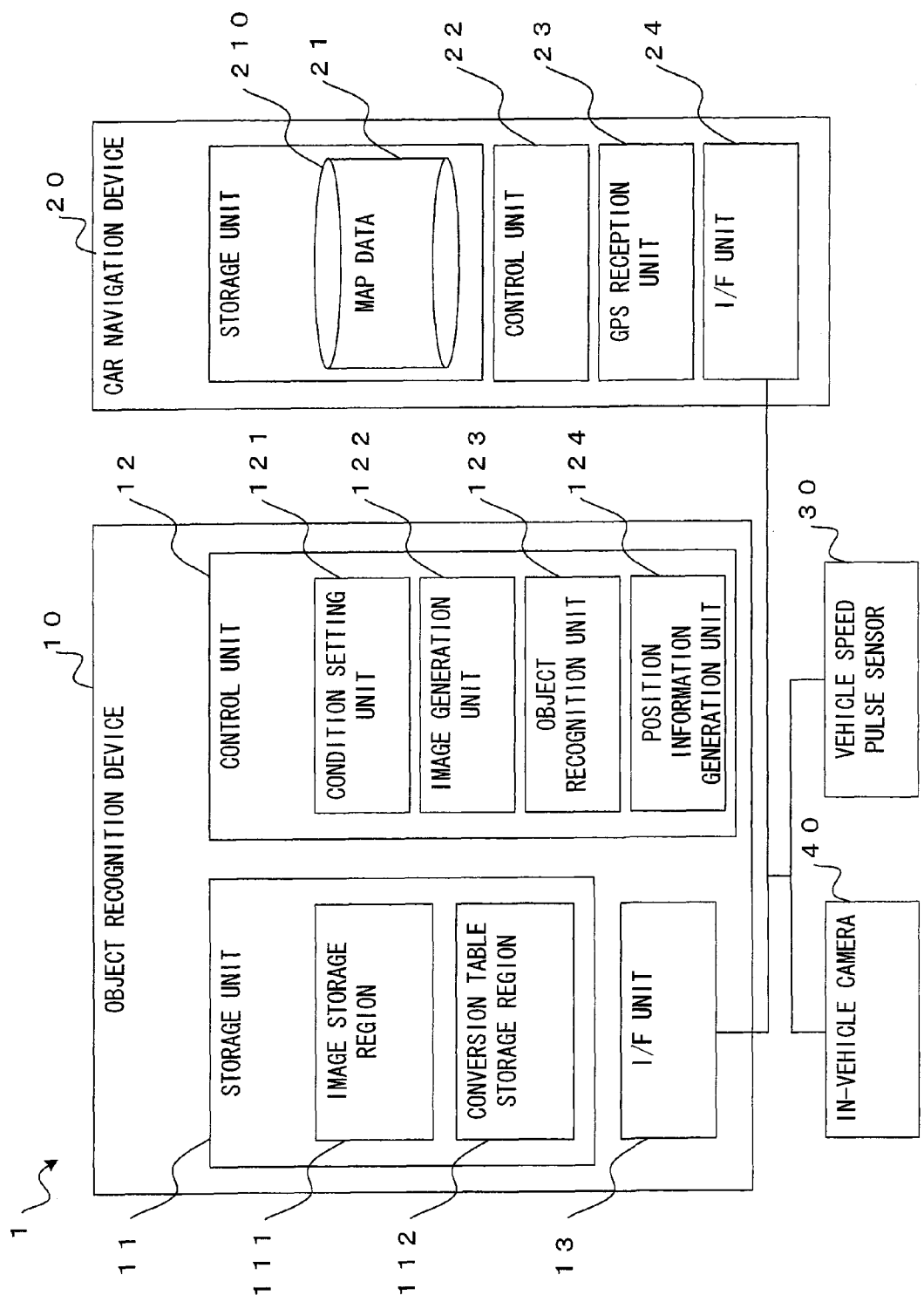
FIG. 1 is a block diagram showing the functional structure of an object recognition system 1 according to a first embodiment of the present invention.

FIG. 1 is a block diagram showing the functional structure of an object recognition system 1 according to the first embodiment of the present application.

As shown in the figure, this object recognition system 1 includes an object recognition device 10, a car navigation device 20, a vehicle speed pulse sensor 30, and an in-vehicle camera 40.

First, the car navigation device 20 will be explained. It should be understood that it would be acceptable to arrange for the object recognition device 10 and the car navigation device 20 to be integrated into one unitary device.

The car navigation device 20 is a device that detects the position of the subject vehicle by utilizing, for example, a GPS (Global Positioning System: the worldwide position measurement system) and/or an autonomous navigation device that employs vehicle speed pulses and a gyro or the like, and that performs travel path guidance to a destination.

This car navigation device 20 includes a storage unit 21, a control unit 22, a GPS reception unit 23, and an interface unit 24 (hereinafter termed an "I/F unit").

Map data 210, that is a road map for the entire country, is stored in advance in the storage unit 21. This map data 210 may be, for example, a database having a structure as shown in FIG. 2.

Figure 2:
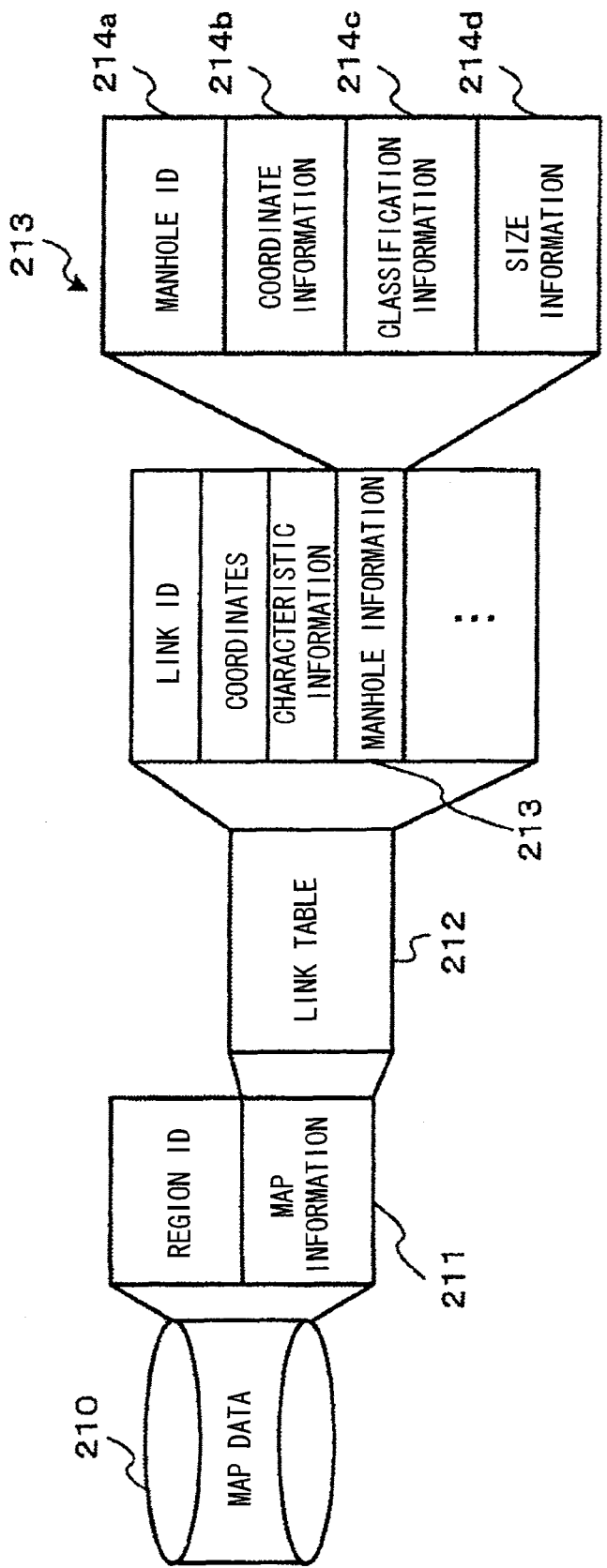
FIG. 2 is a schematic figure showing map data.

FIG. 2 is a schematic figure showing the map data 210. This map data 210 is a set of regional map information units 211, subdivided into a mesh pattern.

Each of these map information units 211 is information that indicates the connection relationships between a node which is either a point of crossing or a point where the number of vehicle lanes or the road width changes, and a link, which is a vector denoting a linkage to an adjacent node. The respective links are managed with a link table 212.

The following types of information may be suggested as information generally stored in the link table 212. Such information may be, for example, the ID of a link, the coordinates of the two ends of a link (i.e. of its start node and its end node), and characteristic information such as distance, direction, road width, and so on.

Here, in addition to the information described above, the link table 212 according to this embodiment includes manhole information 213. This manhole information 213 is information in which are stored manhole IDs 214a that are identifiers of manholes present upon the links, coordinate information 214b that specifies the positions of the manholes, classification information 214c that specifies the classifications of the manholes, and size information 214d that specifies the sizes of the manholes.

In concrete terms, the coordinate information 214b gives position coordinates of the manholes that are present upon the roads, in terms of latitude and longitude. The classification information 214c is information that specifies, for example, the types of the manholes, their shapes, their designs and so on. And the size information 214d is information that specifies, for example, the diameter or the circumference in the case of a circular manhole, or the length of each side in the case of a quadrilateral manhole, or the like.

This manhole information 213 explained above is outputted to the object recognition device 10 by the control unit 22.

The control unit 22 specifies the manhole information 213 for any manhole or manholes that may be present around the subject vehicle, and outputs this information to the object recognition device 10 via the I/F unit 24.

In concrete terms, each time a fixed time interval elapses, the control unit 22 detects the manhole information 213 for the manholes that are present within a predetermined range centered around the current position of the subject vehicle, and that moreover are present upon roads that are connected in series by links from the link on which the vehicle is currently located and outputs this to a condition setting unit 121 of the object recognition device 10. If no such manhole information has been detected, a non-detection signal is outputted.

It should be understood that it would also be acceptable to extract and output only the manhole information 213 for the manholes that are present within a fixed range ahead of the vehicle, by judging the travelling direction of the subject vehicle. Furthermore, if the car navigation device 20 is performing path guidance, it would also be acceptable to arrange for the control unit 22 to extract only the manhole information 213 for the manholes that are present within a fixed range along the path along which the vehicle is being guided.

Moreover, the control unit 22 corrects the position of the subject vehicle by reconciling it with the position information outputted from the object recognition device 10.

The GPS reception unit 23 receives signals from the GPS (Global Positioning System) satellites.

Furthermore, as well as the above, it would also be acceptable for the car navigation device 20 to include a VICS reception unit or the like, that receives road traffic information distributed from a VICS (Vehicle Information and Communication System) center via beacons set up along the roads, or via local FM broadcast stations.

The I/F unit 24 is an interface for performing communication with the object recognition device 10; a unit may be used that employs any suitable communication format.

The object recognition device 10 includes a storage unit 11, a control unit 12, and an I/F unit 13.

The storage unit 11 includes an image storage region 111 and a conversion table storage region 112.

The image storage region 111 stores frame images outputted by an in-vehicle camera 40, and overhead views generated according to these frame images. Schematic figures showing such a frame image and overhead view are given in FIGS. 3A and 3B.

The frame images are images captured by the in-vehicle camera 40 and outputted according to a certain frame rate (refer to 90A and 90B in FIG. 3(a)), while the overhead views are images in which the frame images generated by the image generation unit 122 are viewed looking downwards in the vertical direction (i.e. they are plan views thereof as seen when looking vertically downwards from the sky at the surface of the earth; refer to 91A and 91B in FIG. 3(b)). These images are acquired and generated by the image generation unit 12, and are stored in the image storage region 111.

The conversion table storage region 112 stores a conversion table (not shown in the figures) that is required in order to generate the overhead views from the captured images (i.e. the frame images). This conversion table may, for example, include a correspondence between the coordinate position of each pixel in a frame image and the coordinate position of each pixel in its overhead view, and correction parameters for correcting angular deviations thereof and lens distortions. These correction parameters are, for example, the position of installation of the camera, its installation angle, its lens distortion, the size of its CCD, and so on, and are uniquely determined on the basis of the lens optical characteristics, the camera settings and so on. It should be understood that it would also be acceptable to arrange for this conversion table to be acquired from another device, via the I/F unit 13.

The control unit 12 includes a condition setting unit 121 that sets digital image processing conditions, an image generation unit 122 that converts images from the in-vehicle camera to overhead views, an object recognition unit 123 that detects metallic objects included in these overhead views, and a position information generation unit 124 that specifies the position of the subject vehicle relative to some metallic object.

The condition setting unit 121 sets the details of pre-processing executed by the image generation unit 122 on the basis of a frame image stored in the image storage region 111 and of the image capture environment of that image. In concrete terms, when this condition setting unit 121 receives manhole information 213 from the car navigation device 20, first, it requests the image generation unit 122 to start its processing.

It should be understood that, if the condition setting unit 121 has received from the car navigation device 20 a non-detection signal as the manhole information 213 for manholes present around the subject vehicle, then it requests the image generation unit 122 to terminate its processing.

Furthermore, when the image generation unit 122 starts its processing and acquires a new frame image, the condition setting unit 121 detects the vehicle speed at the present time point on the basis of the pulse signal from the vehicle speed pulse sensor 30. Moreover, using a wireless communication network such as the personal telephone network or the like, the condition setting unit 121 acquires from a server environmental information such as the weather conditions, the current time, and so on. And the condition setting unit 121 makes settings related to conditions for the pre-processing executed by the image generation unit 122, and related to image processing executed by the object recognition unit 123.

Here, the pre-processing executed by the image generation unit 122 includes filtering and gamma correction and so on, which are considered under the digital image processing.

For example, the condition setting unit 121 calculates the amount of noise upon the screen, and, if the amount of noise is great, decides upon a requirement for noise elimination processing (i.e., filtering with smoothing filters of various types) to be executed by the image generation unit 122 in a pre-processing stage, and determines whether or not to cause the image generation unit 122 to perform its function.

Moreover, for example in poor weather conditions or during the night-time when the overall luminance value of the frame image is low, the frame setting unit 121 performs setting of a parameter that determines the intensity of gamma correction.

Furthermore, the condition setting unit 121 decides upon a region in which halation is being generated due to disturbance light.

Since halation is a phenomenon that is engendered in a constant region of the captured image due to the headlights of a following vehicle or the like, accordingly, if at night-time there are some pixels that have values of luminance greater than or equal to a predetermined value over a fixed time period, then the condition setting unit 121 specifies these pixels as being a halation region.

In concrete terms, the condition setting unit 121 compares together the luminance values in the newest frame image, and the luminance values in past frame images over some fixed period of time, and determines whether or not any region exists that continually has luminance values greater than or equal to a predetermined value. And, if a region of the type described above is present within the frame image, then the condition setting unit performs masking processing upon that region.

Here, this masking processing is processing for setting a mask region that will not be a subject for the recognition processing subsequently executed by the object recognition unit 123. For example, the frame image may be divided into blocks, and mask data of length one bit may be set for each of the blocks. And a flag is set in this mask data for each block for which it is decided that halation is occurring, so that it is labeled as a mask region.

It should be understood that, for the environmental information, it would be acceptable to provide a structure in which the current position point is acquired from the car navigation device, and then only the information around that point is acquired; or it would also be acceptable to provide a structure in which the car navigation device 20 acquires this surrounding information directly from a server, and outputs it to the condition setting unit 121.

When the start of processing is requested from the condition setting unit 121, the image generation unit 122 generates overhead views from frame images. In concrete terms, first the image generation unit 122 acquires the frame images outputted by the in-vehicle camera 40, and accumulates them in order of time series in the image storage region 111. And, after having performed pre-processing upon these frame images, by using the conversion table, the image generation unit 122 generates overhead views as seen vertically downwards from above (i.e. plan views as seen from the sky looking towards the surface of the earth). These overhead views that have thus been generated are stored in the image storage region 111 in order of time series.

It should be understood that, while these frame images are outputted according to the frame rate of the in-vehicle camera 40, it would also be acceptable to provide a structure in which, for example, the frame rate changes according to the speed of the vehicle, so that the image generation unit 122 obtains captured frame images that are always a constant distance apart. Furthermore, it would also be acceptable to acquire the frame images at fixed distance intervals, irrespective of the frame rate.

Moreover, the pre-processing that is executed upon the frame images need not necessarily be executed for the entire screen. For example, it would also be possible to set in advance a subject region 900 (refer to the frame image 90A in FIG. 3(a)), that is a region in which there is little concealment by other vehicles, and moreover for which the possibility is great that images of manholes will be captured at an appropriate size, and to take only this region as the subject for the subsequent processing.

The object recognition unit 123 compares together the various overhead views, and recognizes any manholes that are included in these overhead views.

Figure 3:
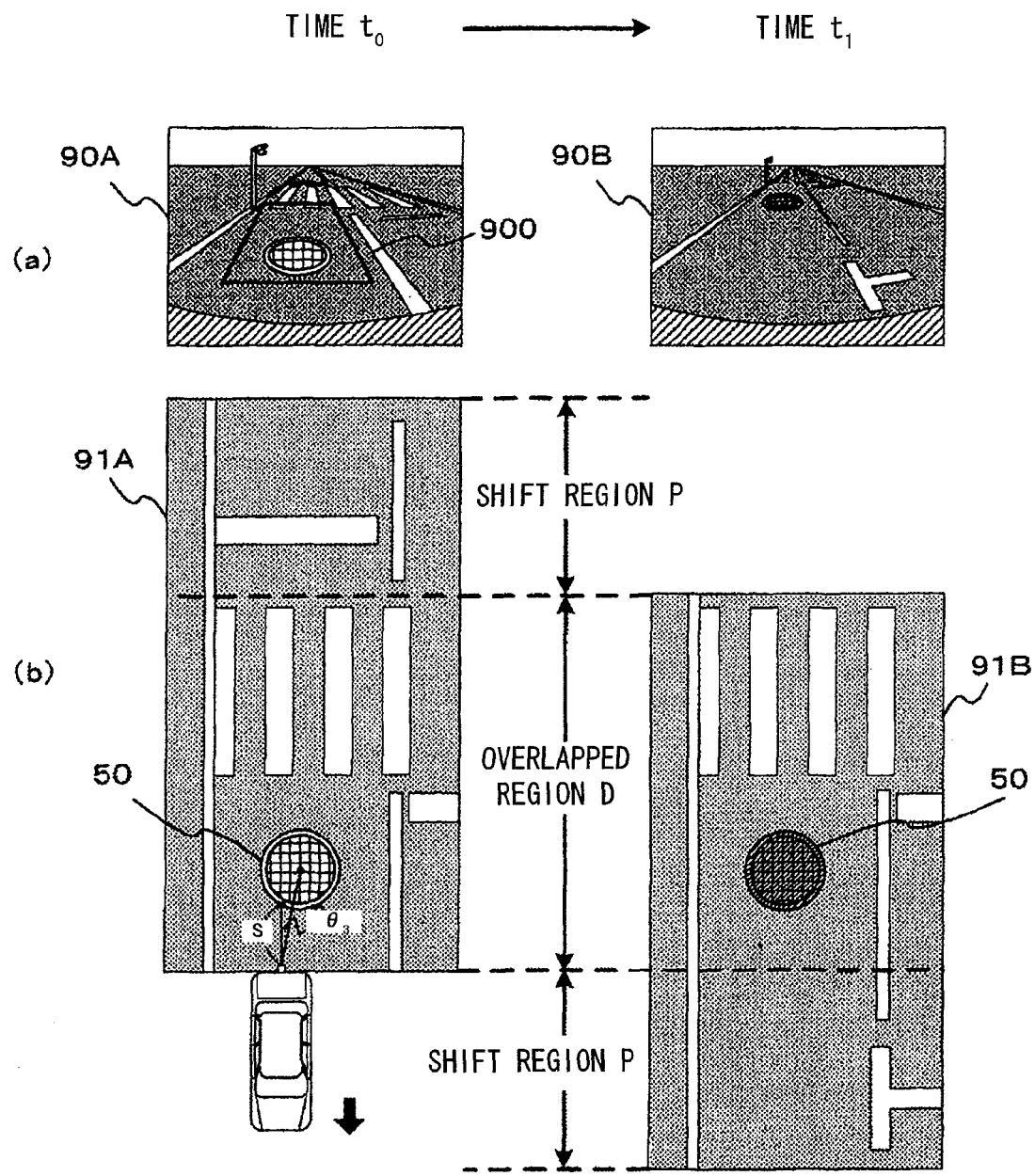
FIG. 3(*a*) show frame images, and FIG. 3(*b*) show overhead views corresponding to FIG. 3(*a*)
Figure 4:
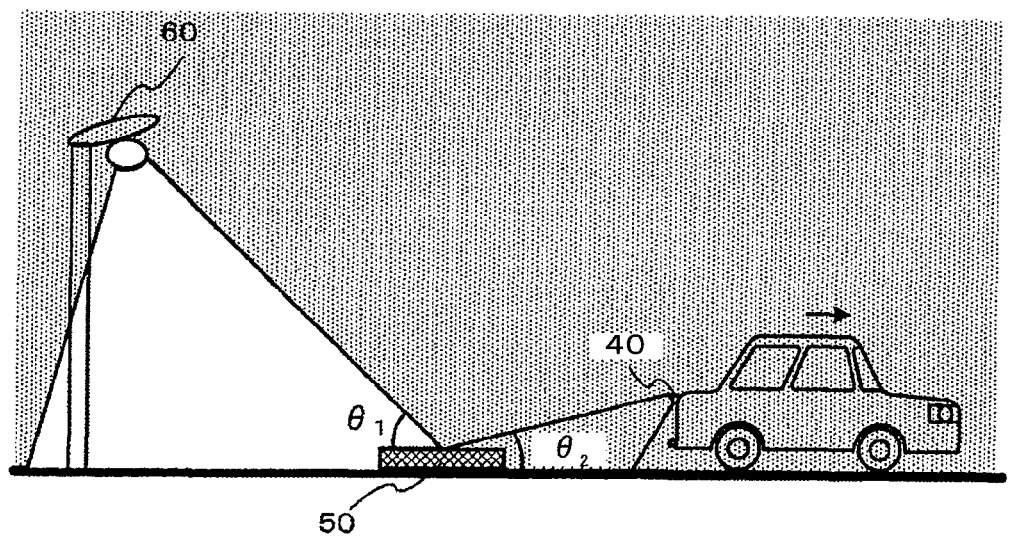
FIG. 4 is a figure for explanation of an image captured by an in-vehicle camera 40.

Now a technique for manhole recognition will be explained with reference to FIGS. 3A, 3B, and 4. FIG. 4 is a figure for explanation of an image captured by the in-vehicle camera 40 when the subject vehicle is travelling at night-time along a road that is illuminated by a street lamp 60.

If, as shown in FIG. 4, the angle of incidence $\theta_1$ of the light from the street lamp 60 upon the manhole 50 and the image capturing angle $\theta_2$ of the manhole 50 from the in-vehicle camera 40 are almost equal, then the manhole 50 reflects the light rays from the street lamp 60, and this reflected light is incident upon the in-vehicle camera 40. Accordingly, a metallic object whose specular reflection component is large as compared to those of other road markings, such as a large manhole 50, is observed in the image captured by the in-vehicle camera 40 as being brighter than the surrounding road surface. On the other hand, if $\theta_1$ and $\theta_2$ are greatly different, then, since the in-vehicle camera 40 does not receive the light that is reflected, accordingly the manhole is observed as being rather dark, similarly to the surrounding road surface and road markings and so on.

Here, as shown in FIGS. 3A and 3B, at the time point $t_0$, $\theta_1$ and $\theta_2$ are almost equal for the frame image 90A and for its overhead view 91A, while, at the time point $t_1$, $\theta_1$ and $\theta_2$ are quite different for the frame image 90B and for its overhead view 91B. In this type of case, due to the difference in image capture timing between the time point $t_0$ and the time point $t_1$, a large disparity is created in the luminance values for the manhole 50 in the two images. The object recognition unit 123 can detect whether or not a manhole is present by utilizing this type of luminance difference.

In concrete terms, the object recognition unit 123 compares together a plurality of these overhead views, specifies shift regions P that correspond to the amount of shifting of the subject vehicle and overlapped regions D that are regions that are mutually overlapped, determines regions in those overlapped regions D where the difference in luminance value is greater than or equal to a threshold value $T_1$, and detects the shapes of those regions.

It should be understood that it would be acceptable to arrange to set the number of overhead views to be used in this recognition processing in advance; or it would also be acceptable to arrange for the user to set this number as desired.

The specification of the shift amount of the subject vehicle (i.e. of the amount of deviation between overhead views) may be calculated by extracting characteristic values of each overhead view, and by detecting correspondences between the images. Furthermore, it would also be acceptable to arrange to calculate this specification from the pulse signal from the vehicle speed pulse sensor 30 or from signals inputted from a steering angle sensor and an angular velocity sensor not shown in the figures, utilizing autonomous navigation; and it would also be acceptable to arrange further to provide stereo cameras in a plurality of positions at the front, at the sides, at the rear and so on of the subject vehicle, and to monitor and estimate the shifting of a specified object and the sequence of images.

Yet further, for the amount of shifting of the subject vehicle, it would also be possible to detect characteristic values (such as edges, characteristic geometric features, or the like) for a predetermined region in the frame image of a monocular camera that is looking backward, such as one that is used for assisting parking or the like, then to detect whether or not a region that has characteristic features that resemble those of that region is present in another frame image, and to take the distance between these regions as being the amount of shifting of the subject vehicle.

It should be understood that, while by way of example the explanation here has cited the case of travelling at night, it would also be possible to recognize metallic objects during the day-time as well, since metallic objects are photographed as having different luminance values during day-time travel as well. Moreover, it would also be acceptable to arrange to change the value of the threshold value $T_1$ related to the difference in luminance value, between day-time and night-time.

The position information generation unit 124 generates position information and outputs it to the car navigation device 20. In concrete terms, the position information generation unit 124 detects manhole information 213 having classification information 214c that matches a manhole that has been recognized by the object recognition unit 123, and generates position information that specifies the ID 214a of this manhole and the distance and angle to the manhole, and outputs it to the car navigation device 20.

The I/F unit 13 is an interface for performing communication with various devices, and includes a wireless communication module. Of course, it would also be acceptable to arrange to utilize any other suitable type of communication means.

The vehicle speed pulse sensor 30 outputs a pulse signal in response to a given rotation of the vehicle wheels. The speed of the subject vehicle and the distance that it has traveled are calculated on the basis of this pulse signal.

The in-vehicle camera 40 is installed at the rear of the vehicle, and captures an image of a predetermined photographic range rearwards of the vehicle by looking slantingly downward at the ground surface. Of course, the position of installation of the camera is not limited to being at the rear of the vehicle; it would also be possible to mount this camera on the front of the vehicle, or on its side, or underneath the body of the vehicle. Furthermore, it would also be acceptable to provide a structure in which a plurality of cameras are mounted to the vehicle, and the images of these cameras are mutually matched together.

Figure 12:
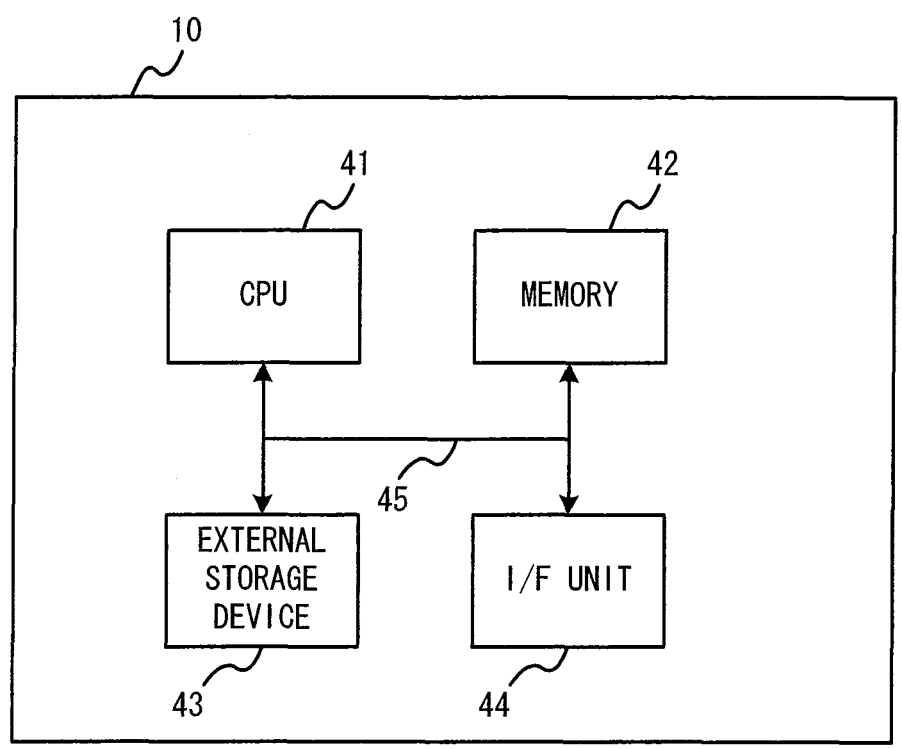
FIG. 12 is a block diagram showing the electrical structure of an object recognition device 10.

Now, the hardware structure of the object recognition device 10 will be explained. FIG. 12 is a block diagram showing the electrical structure of this object recognition device 10.

As shown in FIG. 12, the object recognition device 10 includes a CPU (Central Processing Unit) 41 that is the main portion of a computer and that performs integrated control of various devices, and a memory 42 that stores data of various types in a rewriteable manner. Moreover, this object recognition device 10 includes an external storage device 43 that stores programs of various types and data generated by those programs and so on, and a communication device 44 that includes a wireless LAN module and that performs communication with external devices and so on. These devices are connected to the CPU 41 via a signal line 45 such as a bus or the like.

The CPU 41 executes processing of various types by, for example, loading a program stored upon the external storage device 43 into the memory 42 and executing that program.

While, for example, the external storage device 43 may include a HDD (Hard Disk Drive), of course it is not only limited to being a HDD; as a mechanism for reading computer software, i.e. a program that is distributed, or data, it would also be acceptable additionally to provide a drive such as a CD-ROM or a DVD-ROM or the like.

Figure 5:
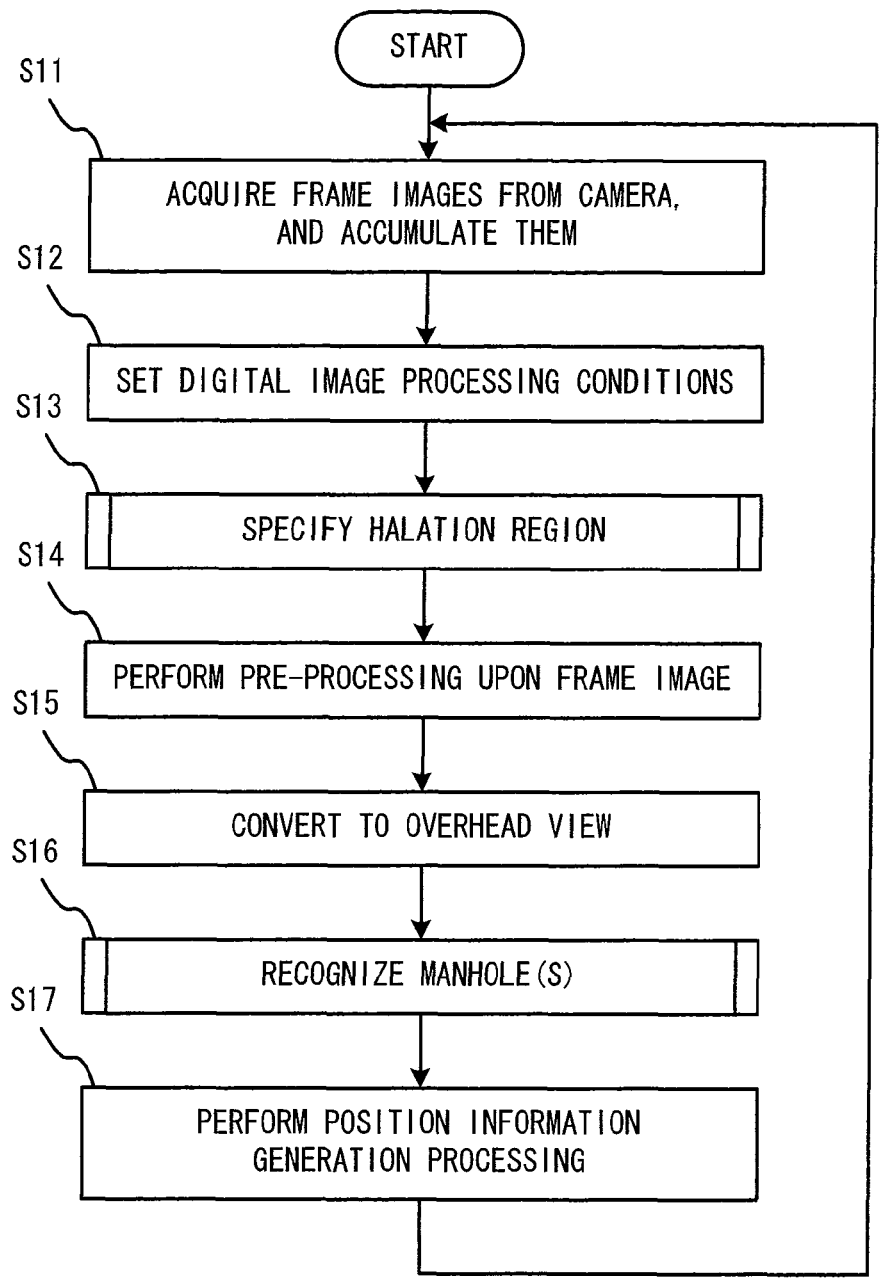
FIG. 5 is a flow chart showing a processing flow during generation of position information from captured images.

The processing executed by the object recognition device 10 having a structure as described above will now be explained using the flow chart shown in FIG. 5. FIG. 5 is a flow chart showing the flow of processing performed by the object recognition device 10 during generation of position information from captured images.

In the object recognition device 10, the condition setting unit 121 receives manhole information 213 about manholes that are present around the vehicle from the car navigation device 20, and starts the following procedural flow by requesting the image generation unit 122 to commence its processing.

First, the image generation unit 122 acquires frame images from the in-vehicle camera 40, and accumulates them in the image storage region 111 (a step S11). In concrete terms, when the image generation unit 122 acquires an image signal from the in-vehicle camera 40, it stores the frames that make up this image in order of time series in the image storage region 111 as frame images, and outputs a condition setting request to the condition setting unit 121.

Upon receipt of this condition setting request, the condition setting unit 121 sets conditions for the pre-processing executed by the image generation unit 122 (a step S12). In concrete terms, the condition setting unit 121 acquires the pulse signal from the vehicle speed pulse sensor 30, and environment information such as the weather conditions at the current position and the current time and so on from a server. And the condition setting unit 121 detects the luminance value of the newest frame image stored in the image storage region 111 and the noise therein, and sets pre-processing conditions such as parameters and so on related to requirements for filtering and correction.

Figure 6:
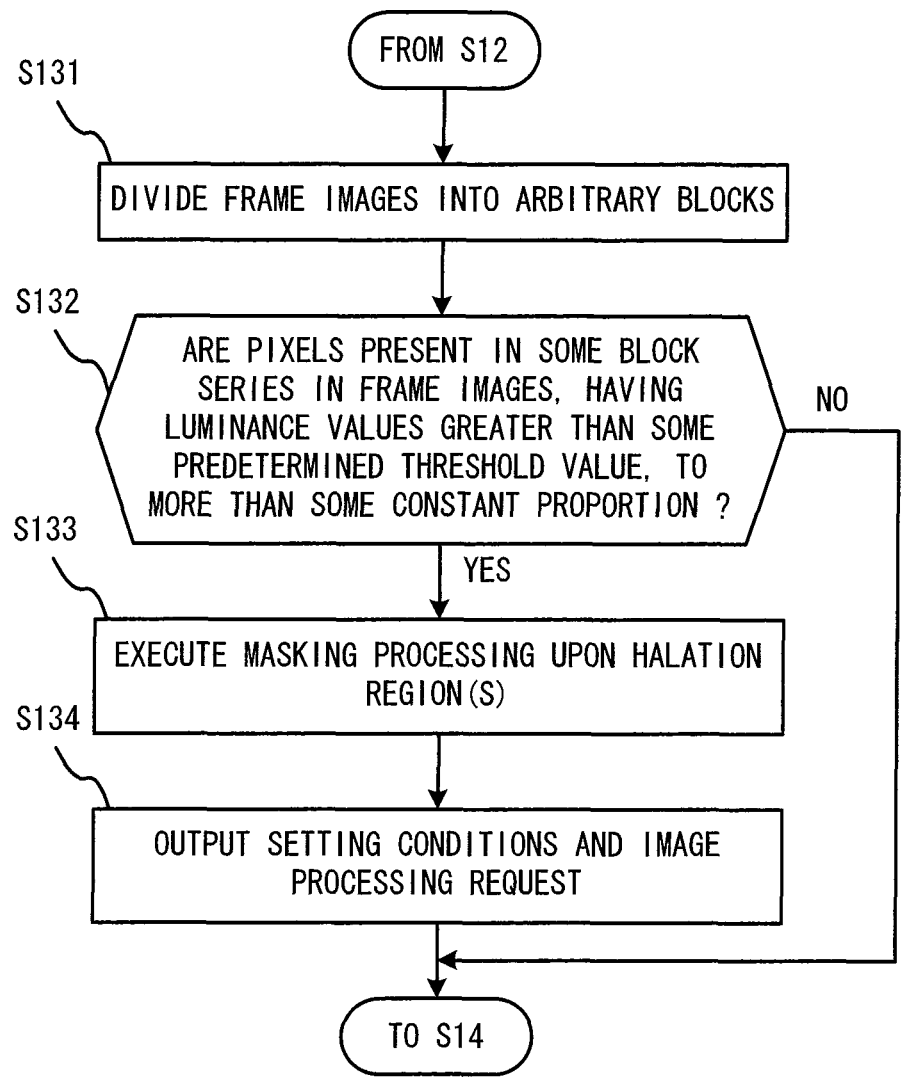
FIG. 6 is a flow chart showing a processing flow performed by a condition setting unit 121 for detection of a halation region.

Next, the condition setting unit 121 detects any region in which halation is occurring (a step S13). Now, the processing for detection of a halation region will be explained in detail with reference to FIG. 6.

The condition setting unit 121 reads out from the image storage region 111 the newest frame image and a predetermined number of previous frame images that have been successively accumulated, and divides each of these images into arbitrary blocks (a step S131). It should be understood that, if the predetermined number of frame images has not yet been accumulated in the image storage region 111, then this processing is skipped, and the flow of control is instead transferred to the step S14.

Next, the condition setting unit 121 compares together the luminance values of the newest frame image and of the series of past frame images block by block, and specifies any halation regions (a step S132). In concrete terms, the condition setting unit 121 decides whether or not, in corresponding blocks continuously over the plurality of frame images, there exists some block in which pixels having luminance greater than or equal to some predetermined value are included in at least some constant proportion. If such a block is present (YES in the step S132), then the flow of control proceeds to a step S133, while if no such block exists (NO in the step S132) then the flow of control is transferred to the step S14.

If some block that has been specified as being a halation region is present in the series of frame images (YES in the step S132), then the condition setting unit 121 executes masking processing upon that block (a step S133). In concrete terms, the condition setting unit 121 labels the block(s) specified as being halation region(s) by setting the corresponding mask region flags (for example to "1").

And the condition setting unit 121 outputs to the image generation unit 122 the pre-processing conditions set in the step S12, and also outputs an image processing request (a step S134).

Returning to FIG. 5, upon receipt of the pre-processing conditions and the request for image processing, the image generation unit 122 performs pre-processing upon the newest frame image (a step S14). In concrete terms, the image generation unit 122 performs digital image processing such as filtering and correction and so on, on the basis of the pre-processing conditions. It should be understood that mask regions that are labeled as such by the condition setting unit 121 are not subjected to this pre-processing, but are ignored.

Next, the image generation unit performs overhead view conversion processing upon the newest frame image, and thereby generates an overhead view (a step S15). In concrete terms, the image generation unit 122 performs coordinate conversion and correction upon each pixel in the frame image on the basis of the conversion table described above, and thereby creates an overhead view. And the image generation unit 122 stores this overhead views that are thus generated in the image storage region 111 in order of time series, and outputs a recognition processing request to the object recognition unit 123.

Upon receipt of this recognition processing request, the object recognition unit 123 compares together a predetermined number of these overhead views, and decides whether any manhole(s) are present within the newest overhead view (a step S16). Now the recognition processing performed by the object recognition unit 123 according to this embodiment will be explained in the following in concrete terms with reference to FIGS. 3A, 3B, and 7.

A case will be explained in which overhead views 91A and 91B like those shown in FIG. 3(*b*) have been generated from frame images 90A and 90B like those shown in FIG. 3(*a*). Here, in these overhead views 91A and 91B, there are included an overlapped region D, that is a region in which these overhead views are overlapped over one another, and shift regions P, that are the regions of difference between the overhead view that has been newly captured and the overhead view that has been captured previously.

Figure 7:
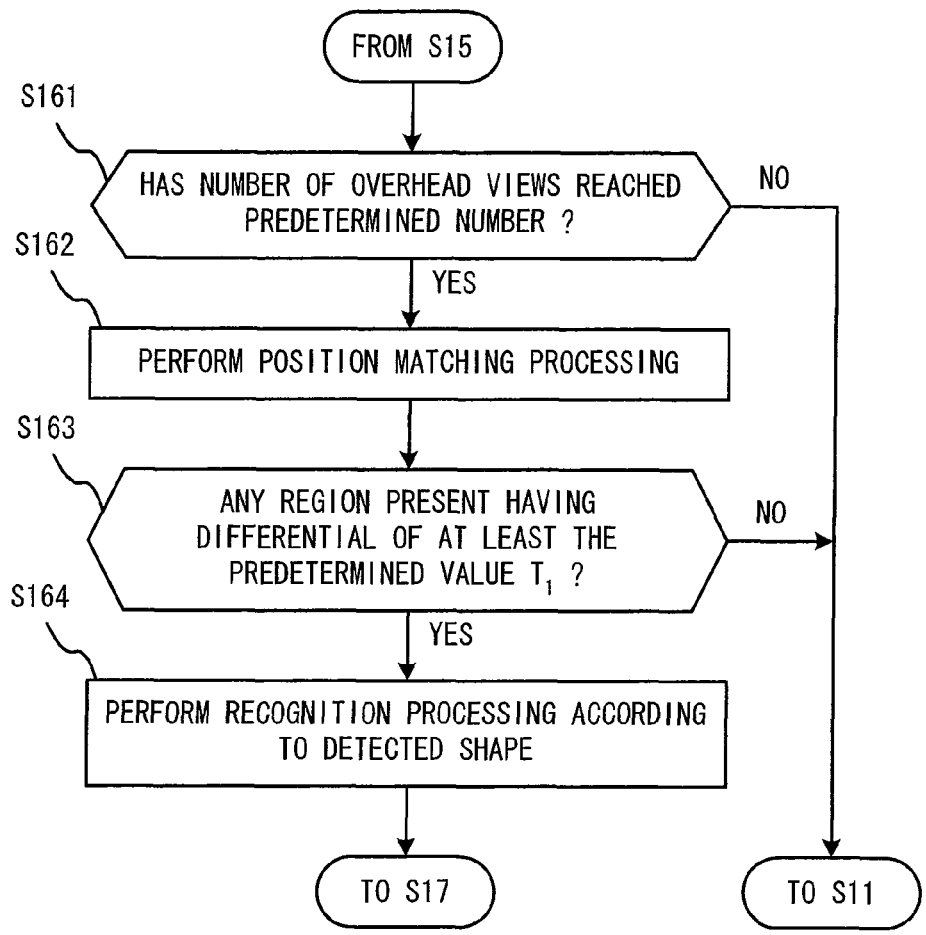
FIG. 7 is a flow chart showing a flow of recognition processing performed by an object recognition unit 123.

FIG. 7 is a flow chart schematically showing the flow of recognition processing performed by the object recognition unit 123.

First, the object recognition unit 123 determines whether or not the number of overhead views available has yet reached the number that is required for performing the recognition processing (a step S161). In concrete terms, after this flow has newly started, the object recognition unit 123 determines whether or not the number of overhead views accumulated in the image storage region 111 has reached a number that is determined in advance. If this number has been reached (YES in the step S161) then the flow of control proceeds to a step S162, whereas if this number has not been reached (NO in the step S161) then the flow of control returns to the step S11 and the above processing is repeated.

Next, the object recognition unit 123 reads out the newest frame image and the overhead view that will be the subject of recognition processing, and performs position matching processing (the step S162). In concrete terms, this position matching processing is processing for specifying the overlapped region D and the shift regions P. The overlapped region D and shift regions P may, for example, be specified by extracting characteristic values of the overhead views such as luminance values or edge components or the like, and by detecting regions whose degree of similarity is high.

Furthermore, for example, it would also be possible to calculate the overlapped region D and the shift regions P from the frame rate and the shift distance per unit time. It should be understood that the shift distance may be calculated by acquiring the detection signal from the vehicle speed pulse sensor 30.

It would also be acceptable to arrange for the overhead views that are to be the subject of recognition processing to be selected in any desired manner. For example, it would be possible to select images captured at constant gaps of distance or time from the newest frame image, or the like.

And the object recognition unit 123 mutually displaces the overhead views 91A and 91B by the specific number of pixels of the shift region P in the direction of shifting, thereby calculating the differential of the overlapped region D, and then determines whether or not any region (pixels) are present for which the difference in their luminances is greater than or equal to a predetermined threshold value $T_1$ (a step S163). If such a region exists (YES in the step S163) then the flow of control proceeds to a step S164, whereas if no such region exists (NO in the step S163) then the flow of control returns to the step S11 and the above processing is repeated. It should be understood that any mask region that has been labeled as such by the condition setting unit 121 is not employed as a subject for the above processing, but is ignored.

Then the object recognition unit 123 recognizes any manhole cover that is present (the step S164). In concrete terms, the object recognition unit 123 performs shape detection upon the region specified in the step S163, for which the difference in luminance is greater than or equal to the predetermined threshold value $T_1$.

For example, if processing is to be performed upon the assumption that the manhole is circular, then circle detection processing is performed. This circle detection processing is for determining how legitimate it is to decide that a circle is present.

For example, the object recognition unit 123 may extract the region specified by the step S163, and may determine its barycenter by taking the averages of the X and Y values of all of the pixels in that region. And it determines the external circumferential contour of that region from the coordinates, calculates the distance to the barycenter for each point upon that external contour, and determines the average value of that distance as being the radius. And it is decided how legitimate it is to consider this region as a circle, by superimposing a standard circle having this radius upon the region, and by calculating the ratio of overlap with the points upon its external circumferential contour (i.e. the degree of similarity). It should be understood that the standard circle that is used should be one that has a certain width, since there is a possibility that the contour may not be perfectly circular, due to noise or the like.

It should be understood that the technique of circular detection is not limited to that described above; it would be acceptable to utilize any suitable technique. For example, it would also be acceptable to arrange to determine the legitimacy of considering the region as a circle, by extracting the edge component of the region and detecting its boundary line, by acquiring two sets of two arbitrary points upon this edge boundary line, and by obtaining the center point and the radius from the lines that bisect them perpendicularly.

Of course, in the shape detection processing, it is also possible to detect quadrilaterals. For example it would be possible to extract, from the points upon the external circumference of the region, the four points whose distance from the barycenter is the greatest and the four points that are furthest in the upward, downward, leftward, and rightward directions, and to determine the legitimacy of considering the region as a quadrilateral according to whether or not a combination thereof exists for which the degree of similarity to a standard quadrilateral is greater than or equal to a predetermined threshold value.

Furthermore, it would also be acceptable to arrange for the object recognition unit 123 to forecast in advance the shape(s) of the manhole(s) present around the vehicle from the classification information 214c, by referring to the surrounding manhole information 213 acquired by the condition setting unit 121 at the start of this processing flow, and to detect only those shape(s). Moreover, it would also be acceptable to provide a structure in which the shape that is required to be detected in the step S12 is set in advance by the condition setting unit 121.

Thereafter, the object recognition unit 123 outputs a position information generation request to the position information generation unit 124.

Returning to FIG. 5, upon receipt of this position information generation request, the position information generation unit 124 detects the classification of any manhole included in the overhead view and the distance and the angle to that manhole from the subject vehicle, and thereby generates position information (a step S17). In concrete terms, the position information generation unit 124 compares together the shape and size of the manhole region that has been recognized by the object recognition unit 123, and the classification information 214c in the manhole information 213 received by the condition setting unit at the start of this processing flow, detects which item in the contents of that classification information 214c matches the best, and acquires the manhole ID 214a.

Furthermore, the position information generation unit 124 detects the distance S and the angle $\theta_3$ (refer to FIG. 3(b)) to that manhole that is closest to the subject vehicle, among the manholes that are included in the overhead view, and generates position information from these values.

Any suitable technique may be used for this detection of the distance S and the angle $\theta_3$; for example, it would be possible to perform edge extraction processing upon the overhead view, and to calculate the distance S and the angle $\theta_3$ from the line joining to the subject vehicle from the point upon this boundary line that is closest to the subject vehicle, and the line joining from the barycenter of the circle to the subject vehicle.

And the position information generation unit 124 outputs the position information that it has generated to the car navigation device 20 via the I/F unit 13, and then this processing flow terminates.

In the above, the processing for generating position information for the manhole(s) included in the frame image has been explained. According to the above description, by utilizing disturbance light such as that due to street lamps or vehicles that point towards the subject vehicle or the like, it is possible to detect a large metallic object that has a high component of specular reflection, even though the subject vehicle is not provided with any means for emitting light.

It should be understood that while, in this embodiment, the metallic object that is the subject of detection is a manhole, it would also be possible to apply the present invention to detection of any other type of metallic object, such as, for example, a metallic joint of the type present upon an expressway or a bridge, or a quadrilateral fire fire hydrant cover whose corners are rounded off, or the like.

For example, since such a joint is a metallic object that is shaped in the form of a straight line joining from one edge of the road to the other, it may be recognized by, in the rectilinear components of the boundary line of the joint region that has been extracted, detecting the directional components of the edges. Moreover, in the case of a fire extinguishing hydrant cover, this may be detected by using generalized Hough conversion upon the boundary edge component.

Furthermore, apart from a metallic object, it is also possible to detect any region for which the specular reflection component is great, for example a puddle or the like.

It should be understood that while, in this embodiment, the overhead views are generated from the frame images, instead of this, it would also be acceptable to extract characteristic values from the frame images, and to convert the coordinates of these characteristic values. These characteristic values may be, for example, characteristics of the pixels such as luminance values, edge components, or color information, graphic elements such as corner points and painted area, or statistical features of definite regions such as their texture and HLAC; indeed, any desired image characteristics may be employed.

Moreover, it should be understood that the present invention is not to be considered as being limited to the embodiment described above; alterations of various kinds may be made, within the scope and the gist of the present invention.

A Variant Embodiment

Figure 8:
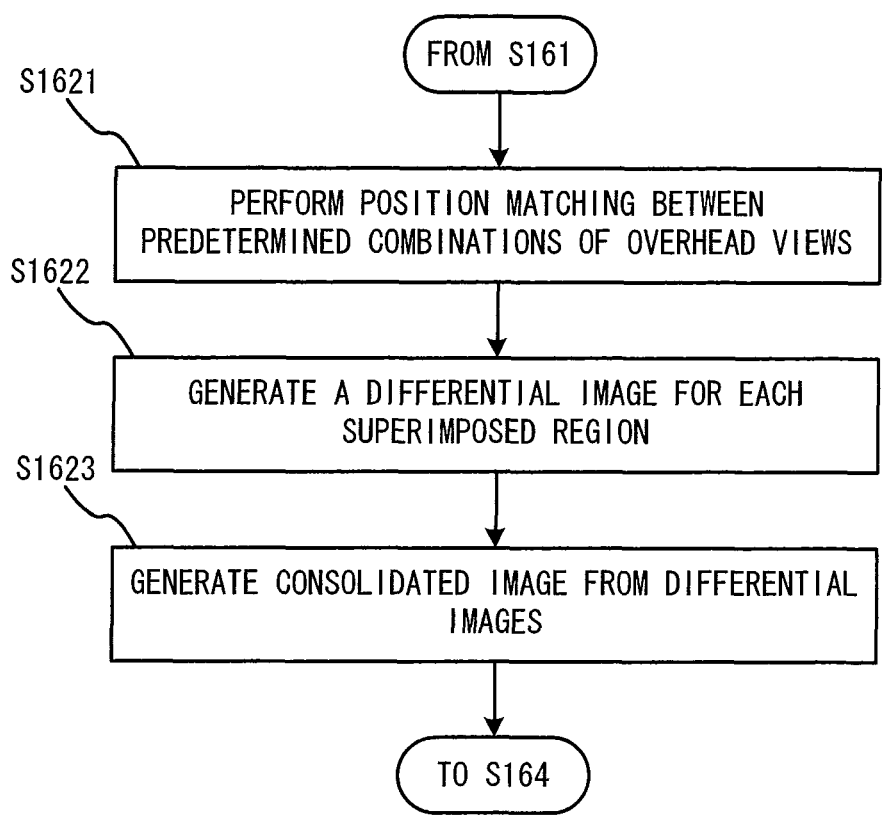
FIG. 8 is a flow chart showing a processing flow for position matching performed by the object recognition unit 123.

While in the embodiment described above, by way of example, two overhead views were used in the recognition processing executed by the object recognition unit 123, in this variant embodiment, a case will be explained in which the number of overhead views that are used in the recognition processing is set to three or more. FIG. 8 is a flow chart showing the flow of processing for position matching performed by the object recognition unit 123.

While, in the step S161 of FIG. 7, the object recognition unit 123 detects whether or not the number of overhead views has yet reached the number of views that are required during execution of the recognition processing, this value may be set to a numerical value that is predetermined in advance, or may be set by the user as desired. Here, if for example this value is three or greater, then the object recognition unit 123 performs position matching processing as shown in FIG. 8.

When, as shown in FIG. 8, the number of overhead views reaches the number that is set in advance (YES in the step S161), then the object recognition unit 123 performs position matching processing between predetermined combinations of these overhead views (a step S1621). In concrete terms, the object recognition unit 123 specifies overlapped regions D and shift regions P between the newest overhead view and each of various combinations of the other overhead views. In specifying the overlapped regions D and the shift regions P, any of the means described above may be employed.

Next, the object recognition unit 123 generates a differential image for the overlapped region D of each of the combinations specified in the step S1621 (a step S1622). In concrete terms, for the overlapped regions D that have been specified for each of the combinations of overhead views, the object recognition unit 123 detects the differences between the luminance values of each of the pixels thereof, and generates differential images for each of the combinations.

Furthermore, the object recognition unit 123 generates a consolidated image from these differential images (a step S1623). In concrete terms, the object recognition unit 123 compares together corresponding pixels in the plurality of differential images generated in the step S1622 and extracts their maximum pixel values, and aggregates them as a single consolidated image.

Thereafter, the object recognition unit 123 performs the shape detection of the step S164 upon this consolidated image. For example, it may perform this shape detection by extracting regions in the consolidated image that have pixel values greater than or equal to some predetermined threshold value.

It should be understood that while, in this variant embodiment, a structure is proposed in which the generation of the consolidated image is performed by aggregating the maximum values of the pixels, in another variation, it would also be possible to utilize an aggregating technique in which the pixel values are added and subtracted, or are averaged.

According to this type of structure, the recognition processing can be executed for images that are more finely subdivided by employing a large number of overhead views in the recognition processing, and manholes can be detected with high probability.

The Second Embodiment

Next, an object recognition device 70 according to a second embodiment of the present invention will be explained. According to the object recognition device of this second embodiment, by taking advantage of disturbance light, it becomes possible to detect even road markings that are non-metallic. In the following, this embodiment will be compared with the first embodiment, and the aspects of difference between them will principally be explained.

Figure 9:
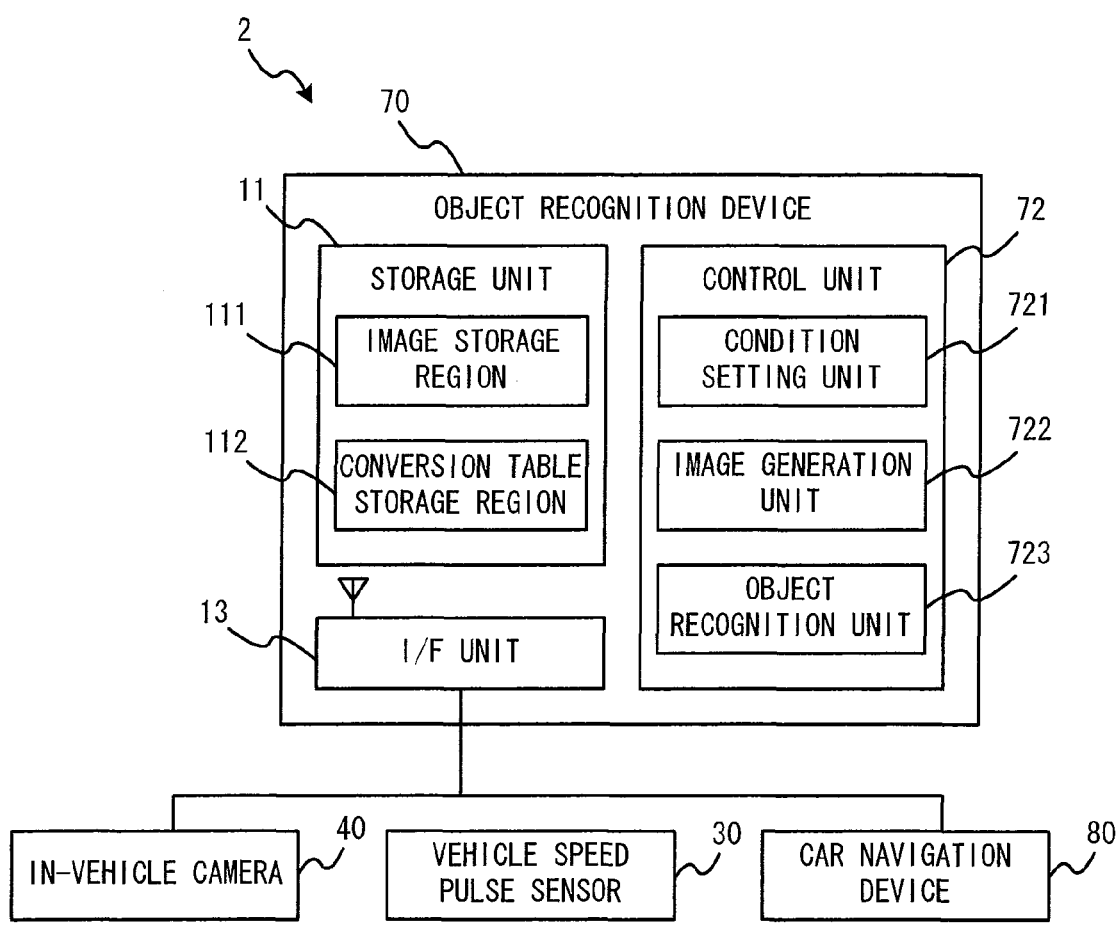
FIG. 9 is a block diagram showing the functional structure of an object recognition system 2 according to a second embodiment of the present invention.

FIG. 9 is a block diagram showing the functional structure of an object recognition system 2.

As shown in this figure, this object recognition system 2 includes the object recognition device 70, a car navigation device 80, a vehicle speed pulse sensor 30, and an in-vehicle camera 40.

The car navigation device 80 is a device that detects the position of the subject vehicle by utilizing, for example, a GPS (Global Positioning System) and/or an autonomous navigation device that employs vehicle speed pulses and a gyro or the like, and performs travel path guidance to a destination.

The object recognition device 70 includes a storage unit 11, a control unit 72, and an I/F unit 13.

Since the storage unit 11 and the I/F unit 13 have similar structures to those of the first embodiment, detailed explanation thereof will here be curtailed.

The control unit 72 includes a condition setting unit 721 that sets digital image processing conditions, an image generation unit 722 that acquires images outputted every fixed periods from the in-vehicle camera and converts them to overhead view, and an object recognition unit 723 that detects road markings included in these overhead views.

The condition setting unit 721 has almost the same structure as the condition setting unit 121 according to the first embodiment, but differs by not acquiring any manhole information from the car navigation device. Upon receipt of a condition setting request from the image generation unit 722, and on the basis of the newest frame image stored in the image storage region 111 and of the image capture environment of that image, this condition setting unit 721 performs setting of the details of pre-processing and specifies any halation region. And it outputs an image processing request to the image generation unit 722.

The image generation unit 722 acquires frame images outputted at predetermined cycles from the in-vehicle camera 40 and accumulates them in time series order in the image storage region 111, and also outputs condition setting requests to the condition setting unit 721.

Furthermore, upon receipt of an image processing request from the condition setting unit 721, the image generation unit 722 performs pre-processing upon the newest frame image on the basis of the set conditions. And it converts the frame image to an overhead view, and outputs a recognition processing request to the object recognition unit 723.

Upon receipt of a recognition processing request from the image generation unit 722, the object recognition unit 723 determines whether or not any road marking is included in the newest overhead view.

If a region is present in the overlapped region D for which the difference in luminances is greater than or equal to the threshold value $T_1$, while the object recognition unit 723 according to the first embodiment determines that this is a metallic object, the object recognition unit 732 according to this second embodiment determines that this is a road marking.

Figure 10:
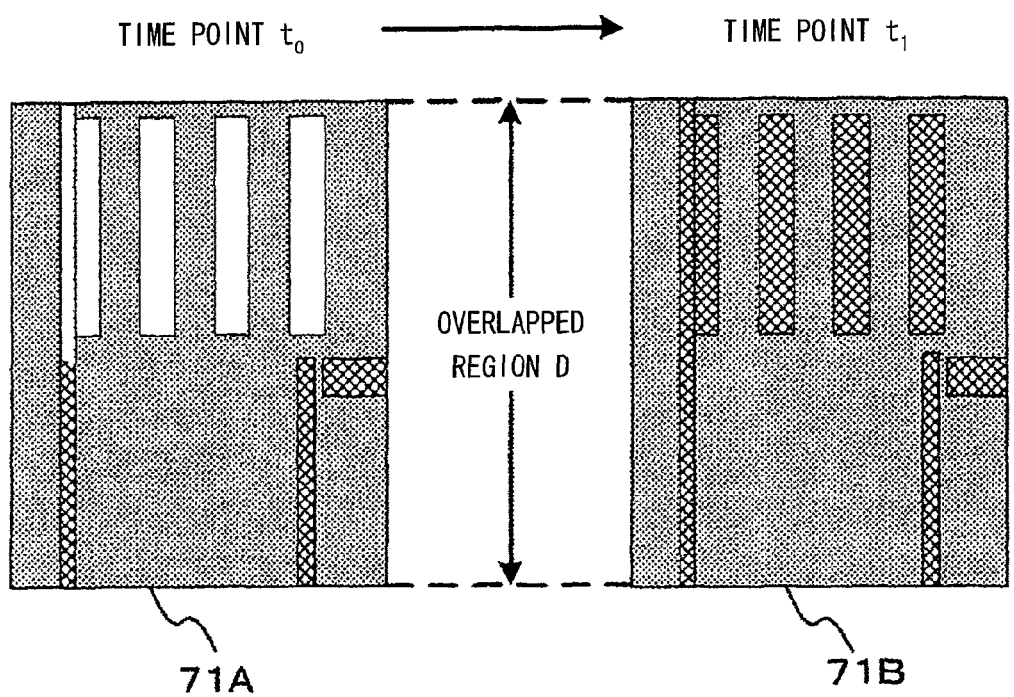
FIG. 10 is a schematic figure showing an overhead view that includes road markings.

For example even if, as shown in FIG. 10, a road marking (here, this is a portion of a pedestrian crossing and a portion of a line at the side of the road) that does not have as great a reflection component as a metallic object is present when disturbance light is present (i.e. at the time point $t_0$) and also when no disturbance light is present (i.e. at the time point $t_1$), then a difference in luminance is present and is greater than that of the road surface. Thus, the object recognition unit 123 performs processing of the following type upon a region that has this kind of luminance difference.

Figure 11:
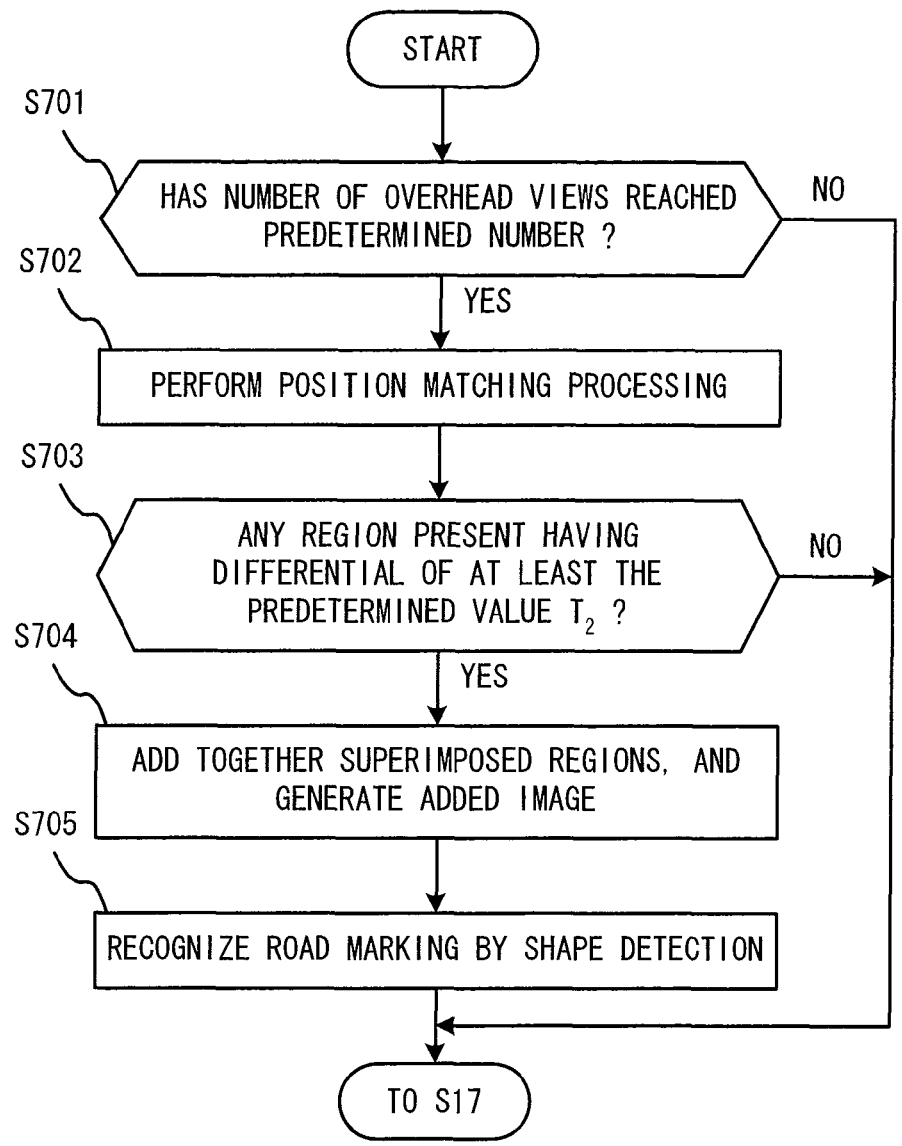
FIG. 11 is a flow chart showing a flow of recognition processing performed by an object recognition unit 723.

FIG. 11 is a flow chart for explanation of the flow of road marking recognition processing performed by the object recognition unit 723. Upon receipt of a recognition processing request from the image generation unit 722, the object recognition unit 723 starts this processing flow.

First, the object recognition unit 723 determines whether or not the number of overhead views has yet reached the number required during execution of the recognition processing (a step S701). If this number has been reached (YES in the step S701) then the flow of control proceeds to a step S702, whereas if this number has not been reached (NO in the step S701) then this processing flow terminates.

Next, the object recognition unit 723 performs position matching processing (the step S702). In concrete terms, the object recognition unit 723 calculates the overlapped region D and the shift regions P of the newest overhead view and a past overhead view from the frame rate (number/sec), the shift distance per unit time (m/sec), the number of pixels of the overhead view in the shift direction, and the number of pixels per unit distance in the shift direction (number/m). It should be understood that the shift distance may be calculated from the detection signal of the vehicle speed pulse sensor 30, acquired when the condition setting unit 721 performs the condition setting processing.

And the object recognition unit 723 mutually displaces the newest overhead view and the past overhead view by just the shift amount of the subject vehicle, and calculates the differential of the luminance value of the overlapped region D. And it detects whether or not any region (pixel) exists for which this luminance difference is greater than or equal to a predetermined threshold value $T_2$ (a step S703). If such a region exists (YES in the step S703) then the flow of control proceeds to a step S704, whereas if no such region exists (NO in the step S703) then this processing flow terminates.

Here, it is desirable for the predetermined threshold value $T_2$ to be a smaller value than the threshold value $T_1$ that is provided according to the first embodiment for detection of metallic objects whose specular reflection component is large, since this is a value that is provided in order to detect road markings that reflect disturbance light.

If some region does exist for which the luminance difference is greater than or equal to the predetermined threshold value $T_2$ (YES in the step S703), then the object recognition unit 723 creates an added image (the step S704). In concrete terms, the object recognition unit 723 adds together the overlapped regions D, and thus creates an added image in which the contrast intensity is increased. It should be understood that it would also be acceptable for this added image synthesis to be done by performing a calculation in which the maximum one of each pair of corresponding pixels is taken as being the valid one.

Next, the object recognition unit determines upon whether any road marking is present (a step S705). In concrete terms, the object recognition unit 723 performs shape detection processing for the region in the added image specified in the step S703, for which the luminance difference is greater than or equal to the predetermined threshold value $T_2$.

Since the shape that is detected differs for each classification of road marking, it should be understood that it would also be acceptable to arrange to determine the shape that is to be the subject of detection by storing information related to the road markings and their classifications (i.e. their shapes) in advance in the map data of the car navigation device 80, and for the object recognition unit 723 to acquire the information related to the road markings that are present in the vicinity from the car navigation device 80.

Moreover, instead of employing shape detection, it would also be acceptable to arrange to recognize the road markings by template matching according to characteristic values. For example, it would be possible to specify the classifications of road markings by matching together characteristic values in the added image (such as the cumulative luminance values or the edge components in the longitudinal direction and in the lateral direction, or the like) and templates that constitute references, in which the characteristic values of road markings are stored.

Yet further, it would also be acceptable to arrange to calculate the relative position of the subject vehicle with respect to the road marking that is detected, and to output this to the car navigation device 80. It also may be arranged for the car navigation device 80 to correct the position of the subject vehicle in accordance therewith.

According to the structure described above, the object recognition device 70 according to this embodiment is able to detect road markings within the captured images by taking advantage of disturbance light. Moreover, by generating the added images, it is possible to recognize road markings with good accuracy, even if the road markings have become worn or the like.

The content of the disclosure of the following application, upon which the right of priority is based, is hereby incorporated herein by reference:
Japanese Patent Application 115,681 of 2008 (filed on Apr. 25, 2008).

The claimed invention is:

1. An object recognition device, comprising:
an image-capturing unit mounted to a mobile body;
a condition setting unit that specifies a halation region upon images including a road surface captured by the image-capturing unit at different time points, and that executes masking processing for labeling a mask region upon the halation region;
an image generation unit that converts the images including the mask region labeled by the condition setting unit to corresponding synthesized images as seen vertically downwards from above;
a detection unit that compares a plurality of the synthesized images and detects corresponding road surface regions within the plurality of synthesized images; and
a recognition unit that recognizes a manhole present upon the road surface based upon the corresponding road surface regions of the plurality of synthesized images while ignoring the mask region;
wherein the recognition unit recognizes the manhole that has a circular or quadrilateral shape by specifying a region based upon a difference in luminance among the corresponding road surface regions of the plurality of synthesized images, and performing circular or quadrilateral shape detection in the specified region, and
wherein the recognition unit recognizes the manhole that has the circular shape by determining an external circumferential contour of the specified region, superimposing a standard circle upon the specified region, calculating an overlap ratio of the standard circle with the external circumferential contour, and deciding whether the specified region is circular based on the calculated overlap ratio.

2. An object recognition device according to claim 1, wherein the detection unit detects the corresponding road surface regions from a shift amount of the mobile body between the plurality of synthesized images.

3. An object recognition device according to claim 2, wherein the detection unit comprises a sensor that detects at least one of vehicle speed, acceleration, and angular velocity, and a shift amount of the mobile body is calculated by using at least one of the sensors.

4. An object recognition device according to claim 2, wherein the detection unit detects a characteristic feature included in the plurality of synthesized images, and calculates a shift amount of the mobile body from a shift amount of the characteristic feature.

5. An object recognition device according to claim 1, wherein the recognition unit generates an added image by adding together the corresponding road surface regions, and recognizes the manhole present upon the road surface from the added image.

6. An object recognition device according to claim 1, wherein the image-capturing unit captures the images including the road surface at the different time points, when a position information of the manhole existing within a predetermined range from the mobile body is supplied from a car navigation device.

7. An object recognition device according to claim 1, further comprising a position information generation unit that detects information for the recognized manhole from manhole information specifying at least positions and shapes of manholes and generates position information of the manhole based on the detected information.

8. An object recognition device according to claim 1, wherein the recognition unit generates a plurality of differential images for the corresponding road surface regions of the plurality of synthesized images, generates a consolidated image from the plurality of differential images, and recognizes the manhole present upon the road surface from the consolidated image.

9. An object recognition device according to claim 8, wherein the recognition unit recognizes the manhole that has a circular or quadrilaterial shape by performing circular or quadrilateral shape detection upon the consolidated image.

10. An object recognition device according to claim 9, wherein the recognition unit recognizes the manhole that has the circular or quadrilateral shape by extracting a region from the consolidated image based upon pixel values of the extracted region, determining an external circumferential contour of the extracted region, superimposing a standard circle upon the extracted region, calculating an overlap ratio of a standard circle with the external circumferential contour, and deciding whether the extracted region is circular based on the calculated overlap ratio.

* * * * *